US009327979B1

(12) United States Patent
Gopalan et al.

(10) Patent No.: US 9,327,979 B1
(45) Date of Patent: May 3, 2016

(54) METHODS FOR REMOVING POLYMER COATINGS FROM SINGLE-WALLED CARBON NANOTUBES

(71) Applicant: Wisconsin Alumni Research Foundation, Madison, WI (US)

(72) Inventors: Padma Gopalan, Madison, WI (US); Michael Scott Arnold, Middleton, WI (US); Yongho Joo, Madison, WI (US); Gerald Joseph Brady, Madison, WI (US); Matthew Shea, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 14/588,513

(22) Filed: Jan. 2, 2015

(51) Int. Cl.
*C01B 31/02* (2006.01)
*B82Y 40/00* (2011.01)
*B82Y 30/00* (2011.01)

(52) U.S. Cl.
CPC ............ *C01B 31/0253* (2013.01); *B82Y 30/00* (2013.01); *B82Y 40/00* (2013.01); *C01B 2202/02* (2013.01); *C01B 2202/22* (2013.01); *C01B 2202/36* (2013.01); *Y10S 977/751* (2013.01); *Y10S 977/847* (2013.01)

(58) Field of Classification Search
CPC .............. C01B 31/0266; C01B 31/026; C01B 31/0273
See application file for complete search history.

(56) References Cited

PUBLICATIONS

Park, Steve, et al. "Highly effective separation of semiconducting carbon nanotubes verified via short-channel devices fabricated using dip-pen nanolithography." ACS nano 6.3 (2012): 2487-2496.*

Brady et al., High performance transistors via aligned polyfluorene-sorted carbon nanotubes, Applied Physics Letters 104, 083107, Feb. 25, 2014, pp. 1-5.
Nish et al., Highly selective dispersion of single-walled carbon nanotubes using aromatic polymers, Nature nanotechnology 2, Sep. 16, 2007, pp. 640-646.
Wang et al., Degradable Conjugated Polymers: Synthesis and Applications in Enrichment of Semiconducting Single?Walled Carbon Nanotubes, Advanced Functional Materials 21, 2011, pp. 1643-1651.
Bindl et al., Enhancing extraction of photogenerated excitons from semiconducting carbon nanotube films as photocurrent, Chemical Physics 413, Aug. 8, 2012, pp. 29-34.
Wang et al., Design and Synthesis of Metal Ion-Recognition-Induced Conjugated Polymers: An Approach to Metal Ion Sensory Materials, J. Am. Chem. Soc. 119, 1997, pp. 12-21.
Irving et al., The stability of transition-metal complexes, Journal of Chemical Society, Jan. 1, 1953, pp. 3192-3210.
Mistry et al., High-Yield Dispersions of Large-Diameter Semiconducting Single-Walled Carbon Nanotubes with Tunable Narrow Chirality Distributions, ACS nano 7, No. 3, Feb. 4, 2013, pp. 2231-2239.
Toshimitsu et al., Semiconducting single-walled carbon nanotubes sorting with a removable solubilizer based on dynamic supramolecular coordination chemistry, Nature Communications, 5:5041, Oct. 3, 2014, pp. 1-9.

* cited by examiner

*Primary Examiner* — Richard M Rump
(74) *Attorney, Agent, or Firm* — Bell & Manning, LLC

(57) ABSTRACT

Methods for removing polymer coatings from the surfaces of single-walled carbon nanotubes are provided. The methods remove polymer coatings that are used to selectively wrap and sort semiconducting single-walled carbon nanotubes from metallic single-walled carbon nanotubes. The methods are based on a process of detaching a polymer coatings by binding transition metal complexes to bi-pyridine repeat units within the polymer backbone.

13 Claims, 5 Drawing Sheets

METHODS FOR REMOVING POLYMER COATINGS FROM SINGLE-WALLED CARBON NANOTUBES

REFERENCE TO GOVERNMENT RIGHTS

This invention was made with government support under 1121288 and 1129802 awarded by the National Science Foundation. The government has certain rights in the invention.

BACKGROUND

Single-walled carbon nanotubes (SWCNTs) have exceptional electronic properties that enable a plethora of semiconducting applications such as field-effect transistors (FETs), photovoltaics (PVs), and gas sensors. In order to implement SWCNTs as the semiconducting material in electronic devices, it is important to purify and sort out the desirable semiconducting SWCNTs (s-SWCNTs) from as-synthesized electronically heterogeneous SWCNT mixtures. This challenge in synthetic heterogeneity has motivated researchers to develop a number of sorting techniques, such as density gradient ultracentrifugation, aqueous two phase separation, and polymer wrapping. Among these methods for sorting s-SWCNTs, polymer wrapping is perhaps the most efficient and potentially the most effective at selectively isolating pure s-SWCNTs. In particular, conjugated polyfluorene polymers are useful materials that have π-π interactions with a high degree of s-SWCNT selectivity based on chirality, diameter and electronic type.

A considerable challenge that has yet to be fully addressed is the removal of remaining polymer chains attached to the sidewalls of s-SWNTs after sorting, which result in high inter-tube energetic barriers and inferior s-SWCNT network connections. Bindl et al. demonstrated that even after several aggressive rinsing steps using ultracentrifugation a significant amount of polymer remains tightly bound to the SWCNTs. (Bindl, D. J., Shea, M. J. & Arnold, M. S. Enhancing extraction of photogenerated excitons from semiconducting carbon nanotube films as photocurrent. *Chemical Physics* 413, 29-34 (2013).) Wang et al. demonstrated degradable alternating copolymers, specifically poly[(9,9-dioctylfluorenyl-2,7-diyl)-alt-co-disilane], which contain HF degradable disilane and fluorene as mediators for the sorting and dispersion of s-SWCNTs. (Wang, W. Z. et al. Degradable Conjugated Polymers: Synthesis and Applications in Enrichment of Semiconducting Single-Walled Carbon Nanotubes. *Advanced Functional Materials* 21, 1643-1651 (2011).) However, the sorting capabilities are limited to purities less than 99% and residual monomers that remain following acid treatment stick to the SWCNT and limit electronic performance. Thus, a polymer removal technique that is compatible with polyfluorene-wrapped s-SWCNTs with high semiconducting purities remains desirable.

SUMMARY

Methods for removing polymer coatings from the surfaces of single-walled carbon nanotubes are provided.

One embodiment of a method for removing a polymer coating from the surfaces of SWCNTs includes the steps of forming a solution comprising: (a) semiconducting single-walled carbon nanotubes coated with a polymer comprising bi-pyridine repeat units in its backbone; (b) a transition metal salt; and (c) a solvent, wherein the transition metal salt binds to the bi-pyridine units, causing the polymer to detach from the semiconducting single-walled carbon nanotubes.

The polymer coatings may comprise a conjugated polyfluorene or a conjugated polyfluorene derivative, such as poly [(9,9-dioctylfluorenyl-2,7-diyl)-alt-co-(6,6'-{2,2'-bipyridine})].

The transition metal salt may be, for example, a transition metal carbonyl salt, such as pentacarbonylrhenium chloride, dirhenium decacarbonyl, or dichlorotetracarbonyldirhodium.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1:
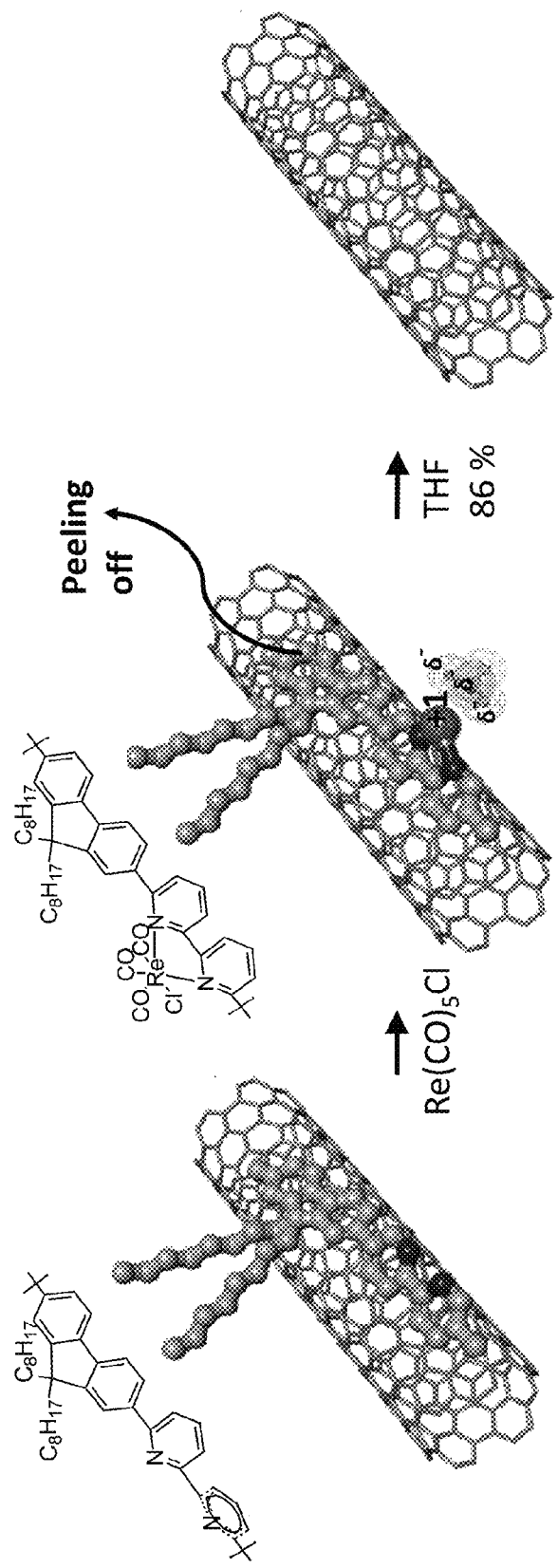
FIG. 1 is a schematic illustration of a mechanism by which a PFO-BPy coating may be removed from an SWCNT using a transition metal salt.

Methods for removing polymer coatings from the surfaces of SWCNTs are provided. The methods can be used to remove polymer coatings that are used to selectively wrap and sort s-SWCNTs from metallic SWCNTs (m-SWCNTs). The methods are based on a process of detaching polymer coatings by binding transition metal complexes to bi-pyridine repeat units within the polymer backbone. Using the present methods, polymer removal can be carried out under mild conditions, such that the electric and/or optoelectric properties of the SWCNTs are not significantly adversely affected. As a result, the methods can be used to provide s-SWCNTs that are suitable for use in electronic devices, such as field effect transistors, and in optoelectronic devices, such as photovoltaic cells.

A basic embodiment of the methods includes the step of forming a solution comprising polymer-coated (also referred to as polymer-wrapped) s-SWCNTs and a transition metal salt in a solvent, where the polymer of the coating comprises bi-pyridine repeat units within its polymer backbone. In solution, the transition metal salt binds to the bi-pyridine ligands of the polymer, causing the polymer to detach from the s-SWCNTs.

The methods can be used to remove polymer coatings from s-SWCNTs having a variety of diameters and bandgaps, including s-SWCNTs that are suited for electronic and/or optoelectronic applications. By way of illustration, the methods can be used to remove a polymer coating from s-SWCNTs having diameters in the range from about 1.3 to about 1.7 nm. Such s-SWCNTs are useful as active materials in electronic devices, such as field effect transistors, and can be made relatively inexpensively using arc discharge techniques. Alternatively, the methods can be used to remove a polymer coating from s-SWCNTs having diameters in the range from about 0.7 to about 1 nm. Such s-SWCNTs are useful as active materials in optoelectronic devices, such as photovoltaic cells, and can be made using Co—Mo catalysts (i.e., using CoMoCAT techniques).

The polymers having bi-pyridine units in their backbone may be derivatives of a variety of polymers known to coat (or 'wrap') SWCNTs, including those that highly selectively coat and sort s-SWCNTs relative to m-SWCNTs. As a result, the present methods can be used in SWCNT sorting protocols for obtaining highly pure s-SWCNT samples from collections of mixed m- and s-SWCNTs. Conjugated polyfluorene and derivatives of conjugated polyfluorene are examples of polymers that highly selectively sort s-SWCNTs from mixed m- and s-SWCNT samples. Thus, in some embodiments of the present methods, the polyfluorene derivative poly[(9,9-dioctylfluorenyl-2,7-diyl)-alt-co-(6,6'-{2,2'-bipyridine})] (PFO-BPy) is used as the polymer coating. PFO-BPy can sort s-SWCNTs having diameters in the range from 1.3 nm to 1.7 nm with a semiconducting purity of greater than 99%. Methods of coating s-SWCNTs with polymers are known. For example, a description of methods of coating s-SWCNTs with PFO-BPy can be found in Brady et al., Appl. Phys. Lett. 104, 083107-1 to 083107-5 (2014).

The transition metal salts used in the methods comprise metal ions that complex with the bi-pyridine ligands of the polymer coatings. Transition metal carbonyl salts, such as rhenium carbonyl salts can be used. Pentacarbonylrhenium chloride ($Re(CO)_5Cl$), dirhenium decacarbonyl $Re_2(CO)_{10}$, or dichlorotetracarbonyldirhodium, $Rh_2Cl_2(CO)_4$ are examples of such salts. However, other transition metal salts that are able to form stable complexes with the bi-pyridine ligands can also be employed. For example, salts comprising the divalent and trivalent transition metal ions $Zn^{2+}$, $Cd^{2+}$, $Cu^{2+}$, $Ni^{2+}$, $Co^{2+}$, $Hg^{2+}$, $Pd^{2+}$, $Mn^{2+}$, $Sn^{2+}$, $Fe^{2+}$, $Ag^+$, $Cu^+$, $Al^{3+}$, $Fe^{3+}$, and $Sb^{3+}$ are also suitable candidates. The salts and the solvents used to formulate the solutions should be selected such that the salts are highly soluble in the solvent. Examples of suitable organic solvents include chloroform, dichloromethane (DCM), dichlorobenzene (DCB) and toluene.

FIG. 1 is a schematic illustration of a mechanism by which the polymer coating may be removed. Panel (i) in FIG. 1 shows a carbon nanotube with a polymer chain (shown here as PFO-BPy) coated on its surface. The structure of the repeat unit of the PFO-BPy is also shown. Panel (ii) shows the formation of a complex between a transition metal salt (shown here as $Re(CO)_5Cl$) and the bi-pyridine units of the polymer coating. The structure of the resulting complex is also shown. The result of the complex formation is the detachment (peeling off) of the polymer coating from the SWCNT. As illustrated in panel (iii) of the figure, the removal of the polymer coating can be facilitated by a rinse step (shown here using a tetrahydrofuran (THF) rinse). As a result of the removal of the polymer coating, the SWCNTs may aggregate and fall out of the solution. In some embodiments of the present methods, at least 80% of the polymer coating is removed from the SWCNTs. This includes embodiments in which at least 85% of the polymer coating is removed from the SWCNTs. Even higher removal percentages can be achieved by carrying out the method multiple times.

EXAMPLE

This example illustrates a method for removing polyfluorene polymers containing bi-pyridine repeat units from s-SWCNTs. The evidence provided in this example shows that pentacarbonylrhenium chloride (I) binds to bi-pyridine contained within PFO-BPy that is wrapped around the SWCNT surface in organic solvent dispersions. FIG. 1 illustrates a proposed mechanism for the detachment of the polymer from the s-SWCNT. However, the inventors do not wish or intend to be bound to any particular theory of the detachment mechanism. In the mechanism shown here, the ions dissolved in chloroform competitively bind to the BPy units and lift them off the nanotube surface by overcoming the π-π interactions between SWCNT and the surrounding polymer. As discussed in detail below, evidence of this phenomenon is provided by x-ray photoelectron spectroscopy (XPS) and optical spectroscopy, which indicate that 85% of the PFO-BPy was removed from the s-SWCNTs by simply attaching metal-ligand complexes to bi-pyridine and rinsing with organic solvent.

Arc-Discharge SWCNT Sorting:
Preparation of Arc Discharge PFO-BPy Solutions:
Large-diameter, semiconducting enriched SWCNTs were extracted from an arc discharge carbon nanotube powder (Nanolab Inc., Waltham, Mass.). A 1:1 weight ratio of 2 mg/ml of arc discharge soot and poly[(9,9-dioctylfluorenyl-2,7-diyl)-alt-co-(6,6'-[2,2'-bipyridine])] (PFO-BPy) (American Dye Source, Quebec, Canada, 48 K Mw) were dispersed in 50 ml of toluene using a horn tip sonicator (Fisher Scientific, Sonic Dismembrator 500) at 64 W power. The sonication time of the initial dispersion was 30 minutes. Following the initial dispersion, the SWCNT solution was centrifuged (Thermo Scientific, Sorvall WX, swing bucket rotor, TH-641) at 300,000 g for 10 minutes to remove un-dispersed materials. The upper 90% of the supernatant was collected and centrifuged for an additional 1 hour at 300,000 g. The supernatant was collected and the toluene was distilled, rendering a gel-like PFO-BPy SWCNT mixture, which was then dispersed in tetrahydrofuran (THF). The solution was then centrifuged and dispersed with bath sonication four times in THF to rinse off as much excess PFO-BPy as possible. The final solution was prepared by horn-tip sonication of the rinsed SWCNT pellet in chloroform for a total of 1 minute. The solution was diluted to a final concentration of 10 μg/ml prior to further treatment with rhenium salts.

65 CNT Sorting:
Poly(9,9-dioctylfluorene-2,7-diyl-co-bipyrine) (PFO-BPy) (American Dye Source, Inc., Mw. 48k) was dissolved in toluene at a concentration of 2 mg/mL by stirring and heating at 80° C. until the solution was clear and slightly yellow. CoMoCAT SWCNTs (NanoIntegris, SG65i) (0.5 mg/mL) were added to the solution and the mixture was homogenized using a horn-tip sonic dismembrator (Fisher Model 500) at 64 W for 15 minutes. The solution was centrifuged at 300,000 g for 10 minutes to remove aggregates and soot. The supernatant was decanted and filtered through a 5 μm filter to further remove aggregates, and immediately rotary evaporated to remove toluene. The resultant material was waxy and blue-gray. This material was dissolved in approximately 10 mL of hot chloroform, and diluted to 60 mL with THF. Then, this solution was centrifuged at 150,000 g for 24 hours. The supernatant contained free PFO-BPy, while the SWCNTs settled to the bottom of the centrifuge tube. The pellets were collected, briefly sonicated at low power to redisperse in chloroform, and again diluted with THF and centrifuged. The centrifugation/dispersion steps were repeated 4 times to drive off free PFO-BPy and the final pellet was redispersed in toluene at 10 µg/mL. This solution was reacted with rhenium complex to remove the PFO-BPy that remained bound to the SWCNTs.

Rhenium Salt Treatment:

In a 2 mL vial with a magnetic stirring bar was charged PFO-BPy s-SWCNT (10 µg/ml) dissolved in 10 mL of chloroform. To the s-SWCNT and polymer mixed solution was added excess pentacarbonylrhenium chloride $Re(CO)_5Cl$ (1 mg), dirhenium decacarbonyl $Re_2(CO)_{10}$, or dichlorotetracarbonyldirhodium, $Rh_2Cl_2(CO)_4$, and the solution was heated to 60° C. overnight. Aggregated dark solid and excess $Re(CO)_5Cl$ salt were precipitated at the bottom of vial. Then, this solution was centrifuged at 10,000 g for 20 min. The dark solid and rhenium salt were collected. In order to remove the stripped PFO-BPy-Re and excess $Re(CO)_5Cl$ salt, the solid was washed with chloroform, THF, and methanol—three times of each—using a centrifuge (10,000 g, 20 min) After washing with solvent, the bundled s-SWCNTs were dissolved in the CHP to isolate the nanotubes. After horn-sonication treatment for 5 min, the nanotube suspension then was deposited onto an HMDS/$SiO_2$(90 nm)/Si(p++) substrate using drop-casting under the vacuum at 60° C. for 10 h. Well-dispersed s-SWCNTs deposited on the substrate were used for XPS, Raman characterization and the field-effect transistor (FET) device fabrication.

FET Device Fabrication and Measurement:

Electron-beam lithography was used to define source-drain electrodes, which are arranged side-by-side in an array, to increase the probability of contacting a SWCNT on the sparse drop cast film. Thermal deposition of palladium (40 nm) was used to create top-contacts to the SWCNTs. Prior to measurement the SWCNT FETs were annealed at 200° C. in a tube furnace with Ar (99.999%) atmosphere for 1 hour. A Keithley digital multimeter (Keithley Instruments, Inc.) was used to measure the electronic characteristics of the FET.

Results:

The detachment of the PFO-BPy in the presence of the rhenium salts was confirmed by optical absorbance and XPS studies.

In the XPS studies, elemental analysis was characterized with a micro-focused monochromated Al Ka X-ray source (Thermo K-alpha XPS). The 125 mm mean radius full 180 degree hemispherical analyzer was operated in Constant Analyzer Energy (CAE) with 400 µm selected area aperture. Survey spectra were collected with pass energy 1400 eV. The resulting data was analyzed by Avantage software, where fully integrated control, acquisition, and peak positioning were characterized by fitting multiplex spectra with Voigt functions.

Optical absorbance spectroscopy was measured using a home-built setup, in which an input monochrometer was used to produce a beam of a single wavelength and to scan over the range 300 nm to 1500 nm. A calibrated Ge photodetector was used to measure the intensity of the transmitted light. The solution path length was 1 cm.

Figure 2:
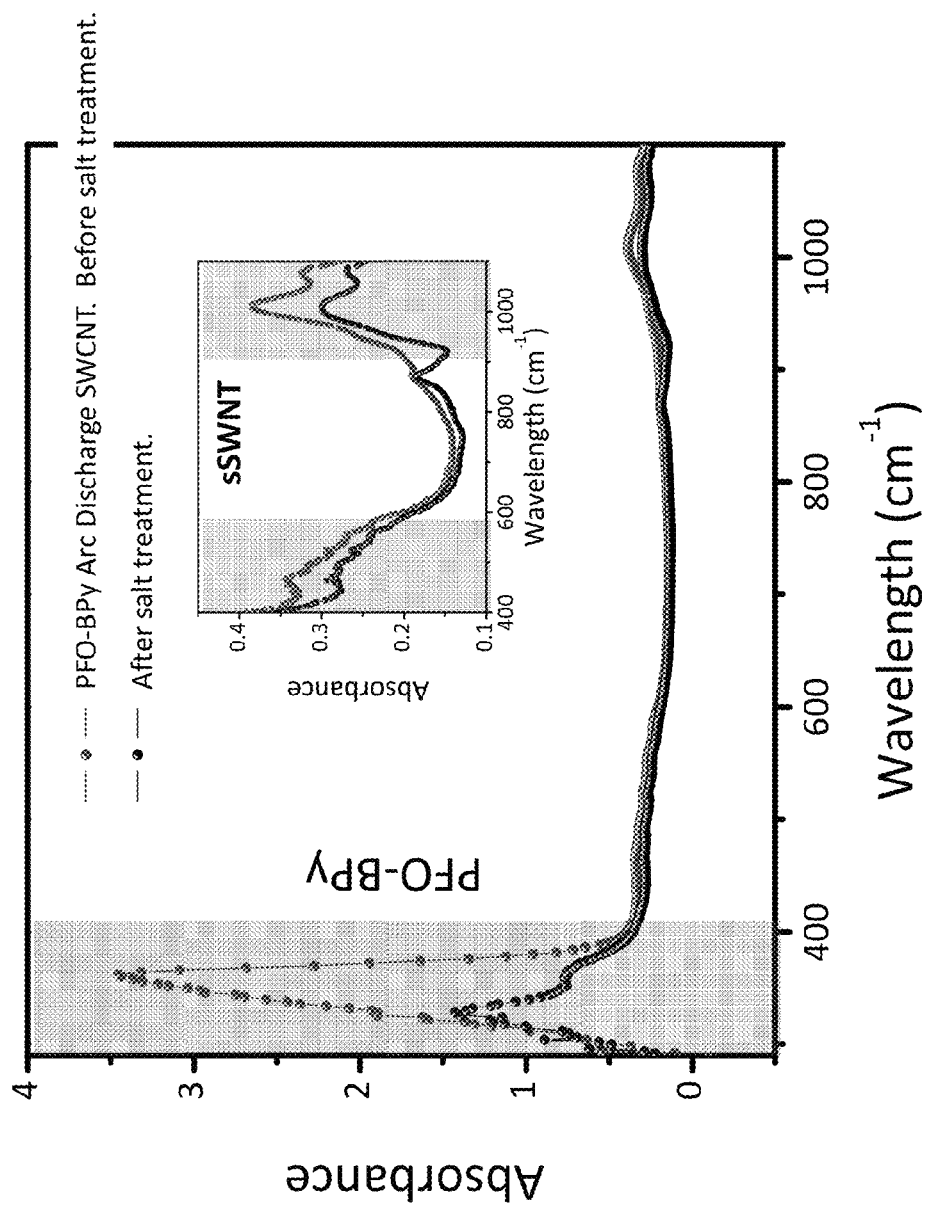
FIG. 2 shows the absorbance spectrum for solutions of the s-SWCNTs made via arc-discharge wrapped with PFO-BPy (PFO-BPy Arc Discharge SWCNT) prior to and after a rhenium salt treatment.
Figure 3:
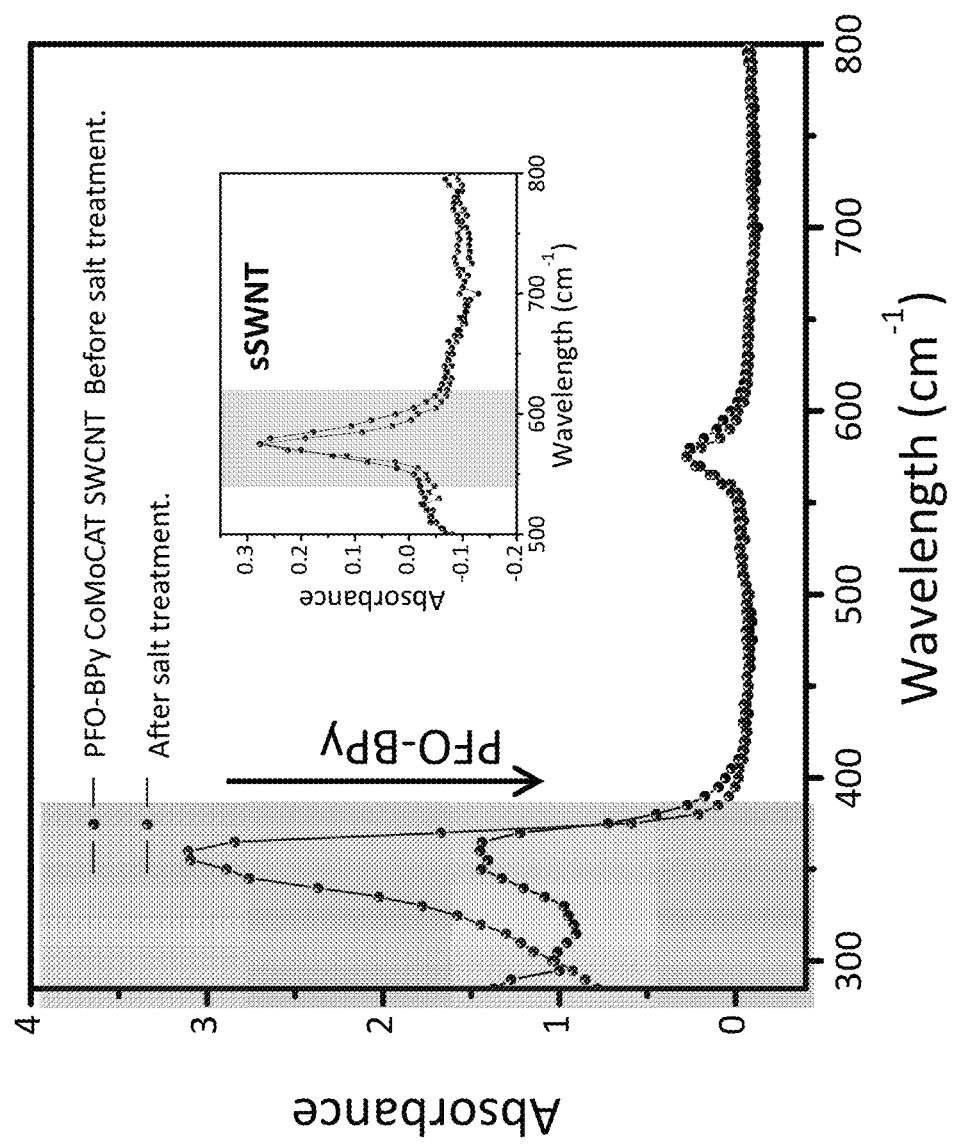
FIG. 3 shows the absorbance spectrum for solutions of the s-SWCNTs made via CoMoCAT wrapped with PFO-BPy (PFO-BPy CoMoCAT SWCNT) prior to and after a rhenium salt treatment.

FIGS. 2 and 3 show the absorbance spectra for solutions of the s-SWCNTs made via arc-discharge and CoMoCAT, respectively, wrapped with PFO-BPy prior to and after the rhenium salt treatment. The reduction in the absorption peak around 370 $cm^{-1}$ shows the detachment of the polymer from the SWCNTs in the presence of the salt. The peak intensity from 400 to 1200 $cm^{-1}$ has been enlarged by a factor of ten and by a factor of two in FIGS. 2A and 2B, respectively.

Figure 4:
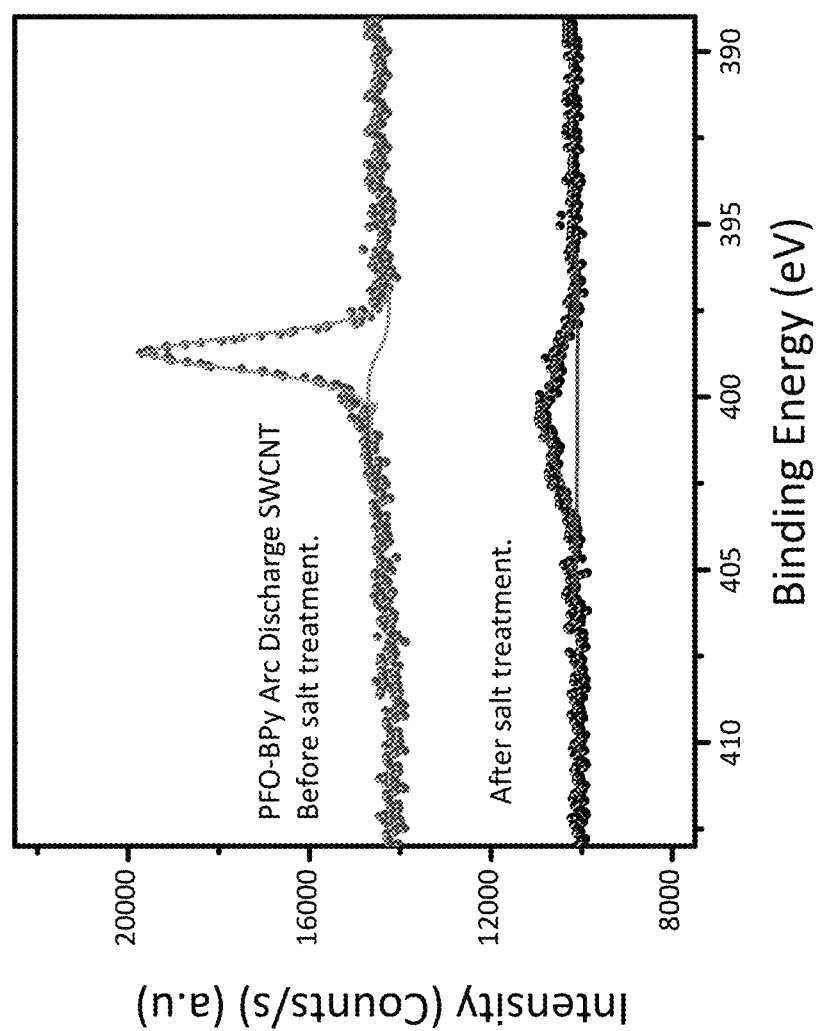
FIG. 4 shows the nitrogen 1s (N 1s) peak from PFO-BPy in the XPS spectra for s-SWCNTs made via arc-discharge wrapped with PFO-BPy prior to the rhenium salt treatment, after the rhenium salt treatment and after further washing.

FIG. 4 shows the nitrogen 1s (N 1s) peak from the PFO-BPy in the XPS spectra for s-SWCNTs made via arc-discharge wrapped with PFO-BPy prior to the rhenium salt treatment, after the rhenium salt treatment and after further washing. The peaks in the figure are normalized based on the carbon 2p peak of the SWCNTs. The disappearance of the N 1s peak confirms the detachment of the PFO-BPy from the s-SWCNTs after salt treatment.

Figure 5:
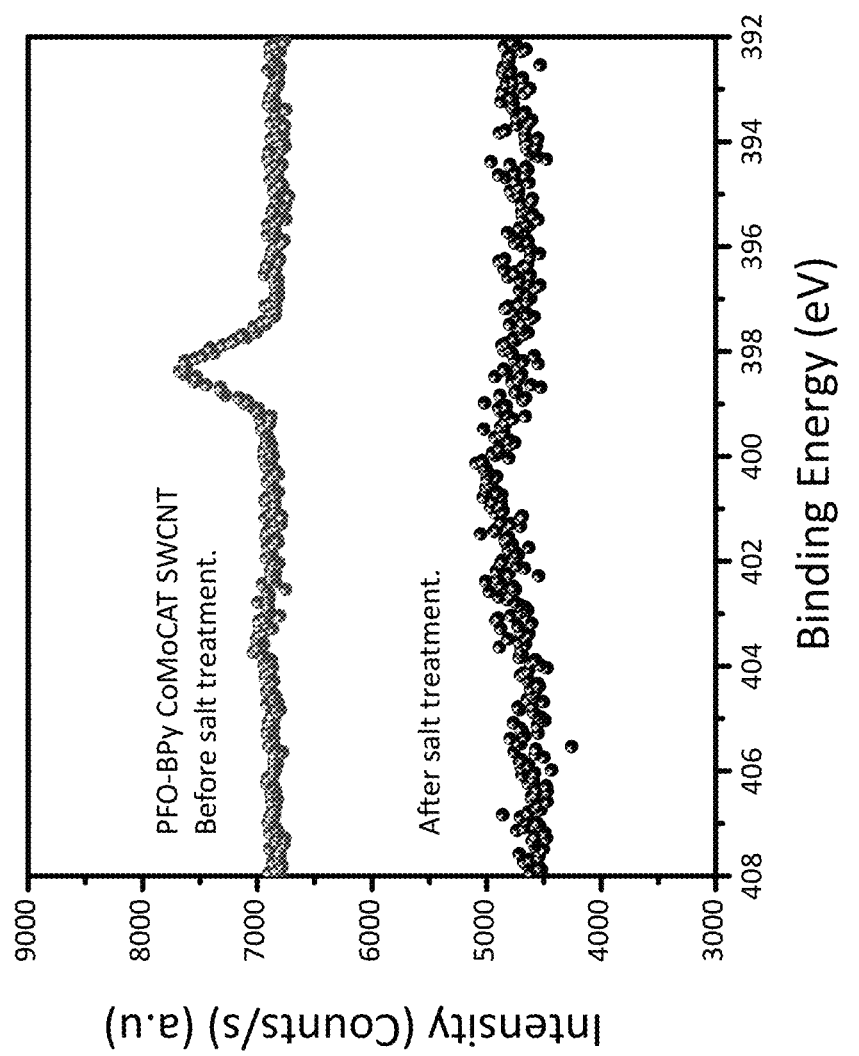
FIG. 5 shows the nitrogen 1s (N 1s) peak from PFO-BPy in the XPS spectra for s-SWCNTs made via CoMoCAT wrapped with PFO-BPy prior to the rhenium salt treatment and after the rhenium salt treatment.

FIG. 5 shows the nitrogen is (N 1s) peak from the PFO-BPy in the XPS spectra for s-SWCNTs made via CoMoCAT wrapped with PFO-BPy prior to the rhenium salt treatment and after the rhenium salt treatment. Again, the disappearance of the N 1s peak confirms the detachment of the PFO-BPy from the s-SWCNTs after salt treatment.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for removing a polymer coating from semiconducting single-walled carbon nanotubes, the method comprising forming a solution comprising: (a) semiconducting single-walled carbon nanotubes coated with a polymer comprising bi-pyridine repeat units in its backbone; (b) a transition metal salt; and (c) a solvent, wherein the transition metal salt binds to the bi-pyridine units, causing the polymer to detach from the semiconducting single-walled carbon nanotubes.

2. The method of claim 1, wherein the polymer is a conjugated polyfluorene or a conjugated polyfluorene derivative.

3. The method of claim 1, wherein the transition metal salt is a transition metal carbonyl salt.

4. The method of claim 1, wherein the transition metal salt is a rhenium salt.

5. The method of claim 4, wherein the rhenium salt is pentacarbonylrhenium chloride.

6. The method of claim 2, wherein the polymer is poly[(9,9-dioctylfluorenyl-2,7-diyl)-alt-co-(6,6'-{2,2'-bipyridine})].

7. The method of claim 6, wherein the transition metal salt is a rhenium carbonyl salt.

8. The method of claim 7, wherein the rhenium salt is selected from pentacarbonylrhenium chloride, dirhenium decacarbonyl, or dichlorotetracarbonyldirhodium.

9. The method of claim 1, wherein the solvent is chloroform.

10. The method of claim 1, wherein the semiconducting single-walled carbon nanotubes have diameters in the range from 1.3 to 1.7 nm.

11. The method of claim 1, wherein the semiconducting single-walled carbon nanotubes have diameters in the range from 0.7 to 1.0 nm.

12. The method of claim 6, wherein the semiconducting single-walled carbon nanotubes have diameters in the range from 1.3 to 1.7 nm.

13. The method of claim 12, wherein the transition metal salt is pentacarbonylrhenium chloride.

* * * * *